(12) United States Patent
Matena

(10) Patent No.: US 6,243,814 B1
(45) Date of Patent: *Jun. 5, 2001

(54) METHOD AND APPARATUS FOR RELIABLE DISK FENCING IN A MULTICOMPUTER SYSTEM

(75) Inventor: Vladimir Matena, Redwood City, CA (US)

(73) Assignee: Sun Microsystem, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/023,074

(22) Filed: Feb. 13, 1998

Related U.S. Application Data

(63) Continuation of application No. 08/552,316, filed on Nov. 2, 1995, now Pat. No. 5,996,075.

(51) Int. Cl.[7] ............................. H02H 3/05; G06F 11/30
(52) U.S. Cl. ................................. 713/200; 714/5; 714/8
(58) Field of Search ........................... 713/200, 201, 713/202; 709/213, 214, 215, 220, 221

(56) References Cited

U.S. PATENT DOCUMENTS

| | | | |
|---|---|---|---|
| 3,735,360 | * 5/1973 | Anderson et al. | 711/149 |
| 4,480,304 | 10/1984 | Carr | 364/200 |
| 4,805,134 | 2/1989 | Calo | 364/900 |
| 4,961,224 | 10/1990 | Yung | 380/25 |
| 5,003,464 | * 3/1991 | Ely | 714/10 |
| 5,113,509 | * 5/1992 | Pennings et al. | 710/37 |
| 5,202,923 | * 4/1993 | Kuriyama | 380/50 |
| 5,204,961 | 4/1993 | Barlow | 395/187.01 |
| 5,299,316 | * 3/1994 | Suzuki | 710/100 |
| 5,321,841 | 6/1994 | East | 395/725 |
| 5,339,443 | 8/1994 | Lockwood | 395/725 |
| 5,347,648 | 9/1994 | Stamm et al. | 395/182.03 |
| 5,361,347 | 11/1994 | Glider | 395/183.2 |
| 5,404,482 | 4/1995 | Stamm et al. | 395/425 |
| 5,408,653 | 4/1995 | Josten | 395/600 |
| 5,416,921 | 5/1995 | Frey | 395/182.09 |
| 5,463,733 | 10/1995 | Forman | 395/182.08 |
| 5,469,556 | 11/1995 | Clifton | 395/186 X |
| 5,568,491 | 10/1996 | Beal | 371/30 |
| 5,619,497 | * 4/1997 | Gallagher et al. | 370/394 |

* cited by examiner

*Primary Examiner*—Dieu-Minh T. Le
(74) *Attorney, Agent, or Firm*—Finnegan, Henderson, Farabow, Garrett & Dunner, L.L.P.

(57) ABSTRACT

A method and apparatus for fast and reliable fencing of resources such as shared disks on a networked system. For each new configuration of nodes and resources on the system, a membership program module generates a new membership list and, based upon that, a new epoch number uniquely identifying the membership correlated with the time that it exists. A control key based upon the epoch number is generated, and is stored at each resource controller and node on the system. If a node is identified as failed, it is removed from the membership list, and a new epoch number and control key are generated. When a node sends an access request to a resource, the resource controller compares its locally stored control key with the control key stored at the node (which is transmitted with the access request). The access request is executed only if the two keys match. The membership list is revised based upon a node's determination (by some predetermined criterion or criteria, such as slow response time) of the failure of a resource, and is carried out independently of any action (either hardware or software) of the failed resource.

1 Claim, 4 Drawing Sheets

METHOD AND APPARATUS FOR RELIABLE DISK FENCING IN A MULTICOMPUTER SYSTEM

This is a continuation of application Ser. No. 08/552,316, filed Nov. 2, 1995, now U.S. Pat. No. 5,996,075, the contents of which are incorporated herein by reference.

The present invention relates to a system for reliable disk fencing of shared disks in a multicomputer system, e.g. a cluster, wherein multiple computers (nodes) have concurrent access to the shared disks. In particular, the system is directed to a high availability system with shared access disks.

BACKGROUND OF THE INVENTION

In clustered computer systems, a given node may "fail", i.e. be unavailable according to some predefined criteria which are followed by the other nodes. Typically, for instance, the given node may have failed to respond to a request in less than some predetermined amount of time. Thus, a node that is executing unusually slowly may be considered to have failed, and the other nodes will respond accordingly.

When a node (or more than one node) fails, the remaining nodes must perform a system reconfiguration to remove the failed node(s) from the system, and the remaining nodes preferably then provide the services that the failed node(s) had been providing.

It is important to isolate the failed node from any shared disks as quickly as possible. Otherwise, if the failed (or slowly executing) node is not isolated by the time system reconfiguration is complete, then it could, e.g., continue to make read and write requests to the shared disks, thereby corrupting data on the shared disks.

Disk fencing protocols have been developed to address this type of problem. For instance, in the VAXcluster system, a "deadman brake" mechanism" is used. See Davis, R. J., *VAXcluster Principles* (Digital Press 1993), incorporated herein by reference. In the VAXcluster system, a failed node is isolated from the new configuration, and the nodes in the new configuration are required to wait a certain predetermined timeout period before they are allowed to access the disks. The deadman brake mechanism on the isolated node guarantees that the isolated node becomes "idle" by the end of the timeout period.

The deadman brake mechanism on the isolated node in the VAXcluster system involves both hardware and software. The software on the isolated node is required to periodically tell the cluster interconnect adaptor (CI), which is coupled between the shared disks and the cluster interconnect, that the node is "sane". The software can detect in a bounded time that the node is not a part of the new configuration. If this condition is detected, the software will block any disk I/O, thus setting up a software "fence" preventing any access of the shared disks by the failed node. A disadvantage presented by the software fence is that the software must be reliable; failure of (or a bug in) the "fence" software results in failure to block access of the shared disks by the ostensibly isolated node.

If the software executes too slowly and thus does not set up the software fence in a timely fashion, the CI hardware shuts off the node from the interconnect, thereby setting up a hardware fence, i.e. a hardware obstacle disallowing the failed node from accessing the shared disks. This hardware fence is implemented through a sanity timer on the CI host adaptor. The software must periodically tell the CI hardware that the software is "sane". A failure to do so within a certain time-out period will trigger the sanity timer in CI. This is the "deadman brake" mechanism.

Other disadvantages of this node isolation system are that:

it requires an interconnect adaptor utilizing an internal timer to implement the hardware fence.

the solution does not work if the interconnect between the nodes and disks includes switches or any other buffering devices. A disk request from an isolated node could otherwise be delayed by such a switch or buffer, and sent to the disk after the new configuration is already accessing the disks. Such a delayed request would corrupt files or databases.

depending on the various time-out values, the time that the members of the new configuration have to wait before they can access the disk may be too long, resulting in decreased performance of the entire system and contrary to high-availability principles.

From an architectural level perspective, a serious disadvantage of the foregoing node isolation methodology is that it does not have end-to-end properties; the fence is set up on the node rather than on the disk controller.

It would be advantageous to have a system that presented high availability while rapidly setting up isolation of failed disks at the disk controller.

Other UNIX-based clustered systems use SCSI (small computer systems interface) "disk reservation" to prevent undesired subsets of clustered nodes from accessing shared disks. See, e.g., the ANSI SCSI-2 Proposed Standard for information systems (Mar. 9, 1990, distributed by Global Engineering Documents), which is incorporated herein by reference. Disk reservation has a number of disadvantages; for instance, the disk reservation protocol is applicable only to systems having two nodes, since only one node can reserve a disk at a time (i.e. no other nodes can access that disk at the same time). Another is that in a SCSI system, the SCSI bus reset operation removes any disk reservations, and it is possible for the software disk drivers to issue a SCSI bus reset at any time. Therefore, SCSI disk reservation is not a reliable disk fencing technique.

Another node isolation methodology involves a "poison pill"; when a node is removed from the system during reconfiguration, one of the remaining nodes sends a "poison pill", i.e. a request to shut down,.to the failed node. If the failed node is in an active state (e.g. executing slowly), it takes the pill and becomes idle within some predetermined time.

The poison pill is processed either by the host adaptor card of the failed node, or by an interrupt handler on the failed node. If it is processed by the host adaptor card, the disadvantage is presented that the system requires a specially designed host adaptor card to implement the methodology. If it is processed by an interrupt handler on the failed node, there is the disadvantage that the node isolation is not reliable; for instance, as with the VAXcluster discussed above, the software at the node may itself by unreliable, time-out delays are presented and again the isolation is at the node rather than at the shared disks.

A system is therefore needed that prevents shared disk access at the disk sites, using a mechanism that both rapidly and reliably blocks an isolated node from accessing the shared disks, and does not rely upon the isolated node itself to support the disk access prevention.

SUMMARY OF THE INVENTION

The present invention utilizes a method and apparatus for quickly and reliably isolating failed resources, including I/O devices such as shared disks, and is applicable to virtually any shared resource on a computer system or network. The system of the invention maintains a membership list of all the active shared resources, and with each new configuration, such as when a resource is added or fails (and thus should be functionally removed), the system generates a new epoch number or other value that uniquely identifies that configuration at that time. Thus, identical memberships occurring at different epoch numbers, particularly if a different membership set has occurred in between.

Each time a new epoch number is generated, a control key value is derived from it and is sent to the nodes in the system, each of which stores the control key locally as its own node key. The controllers for the resources (such as disk controllers) also store the control key locally. Thereafter, whenever a shared resource access request is sent to a resource controller, the node key is sent with it. The controller then checks whether the node key matches the controller's stored version of the control key, and allows the resource access request only if the two keys match.

When a resource fails, e.g. does not respond to a request within some predetermined period of time (indicating a possible hardware or software defect), the membership of the system is determined anew, eliminating the failed resource. A new epoch number is generated, and therefrom a new control key is generated and is transmitted to the all the resource controllers and nodes on the system. If an access request arrives at a resource controller after the new control key is generated, the access request will bear a node key that is different from the current control key, and thus the request will not be executed. This, coupled with preventing nodes from issuing access requests to resources that are not in the current membership set, ensures that failed resources are quickly eliminated from access, by requiring that all node requests, in order to be processed, have current control key (and hence membership) information.

The nodes each store program modules to carry out the functions of the invention - - - e.g., a disk (or resource) manager module, a distributed lock manager module, and a membership module. The distribution of these modules allows any node to identify a resource as failed and to communicate that to the other nodes, and to generate new membership lists, epoch numbers and control keys.

The foregoing system therefore does not rely upon the functioning of a failed resource's hardware or software, and provides fast end-to-end (i.e. at the resource) resource fencing.

DESCRIPTION OF THE PREFERRED EMBODIMENTS

Figure 1:
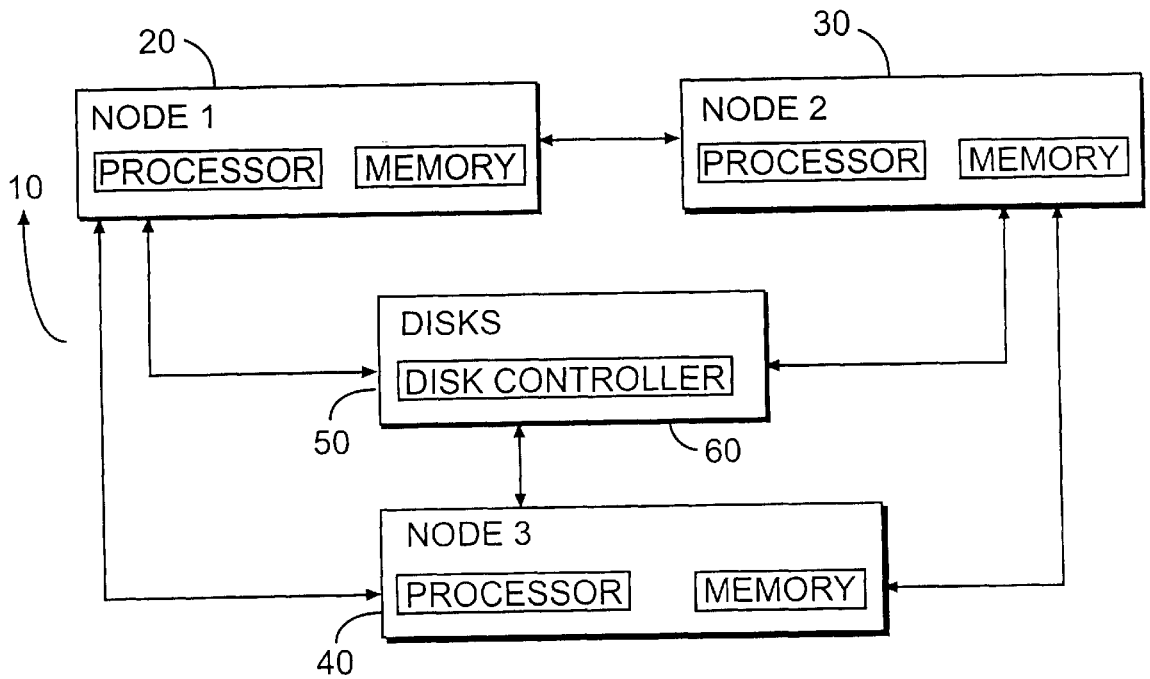
FIG. 1 is a top-level block diagram showing several nodes provided with access to a set of shared discs.

The system of the invention is applicable generally to clustered systems, such as system 10 shown in FIG. 1, including multiple nodes 20–40 (Nodes 1–3 in this example) and one or more sets of shared disks 50. Each of nodes 20–40 may be a conventional processor-based system having one or more processors and including memory, mass storage, and user I/O devices (such as monitors, keyboards, mouse, etc.), and other conventional computer system elements (not all shown in FIG. 1), and configured for operation in a clustered environment.

Disks 50 will be accessed and controlled via a disk controller 60, which may include conventional disk controller hardware and software, and includes a processor and memory (not separately shown) for carrying out disk control functions, in addition to the features described below.

The system of the invention may in general be implemented by software modules stored in the memories of the nodes 20–40 and of the disk controller. The software modules may be constructed by conventional software engineering, given the following teaching of suitable elements for implementing the disk fencing system of the invention. Thus, in general in the course of the following description, each described function may be implemented by a separate program module stored at a node and/or at a resource (e.g. disk) controller as appropriate, or several such functions may be implemented effectively by a single multipurpose module.

Figure 2:
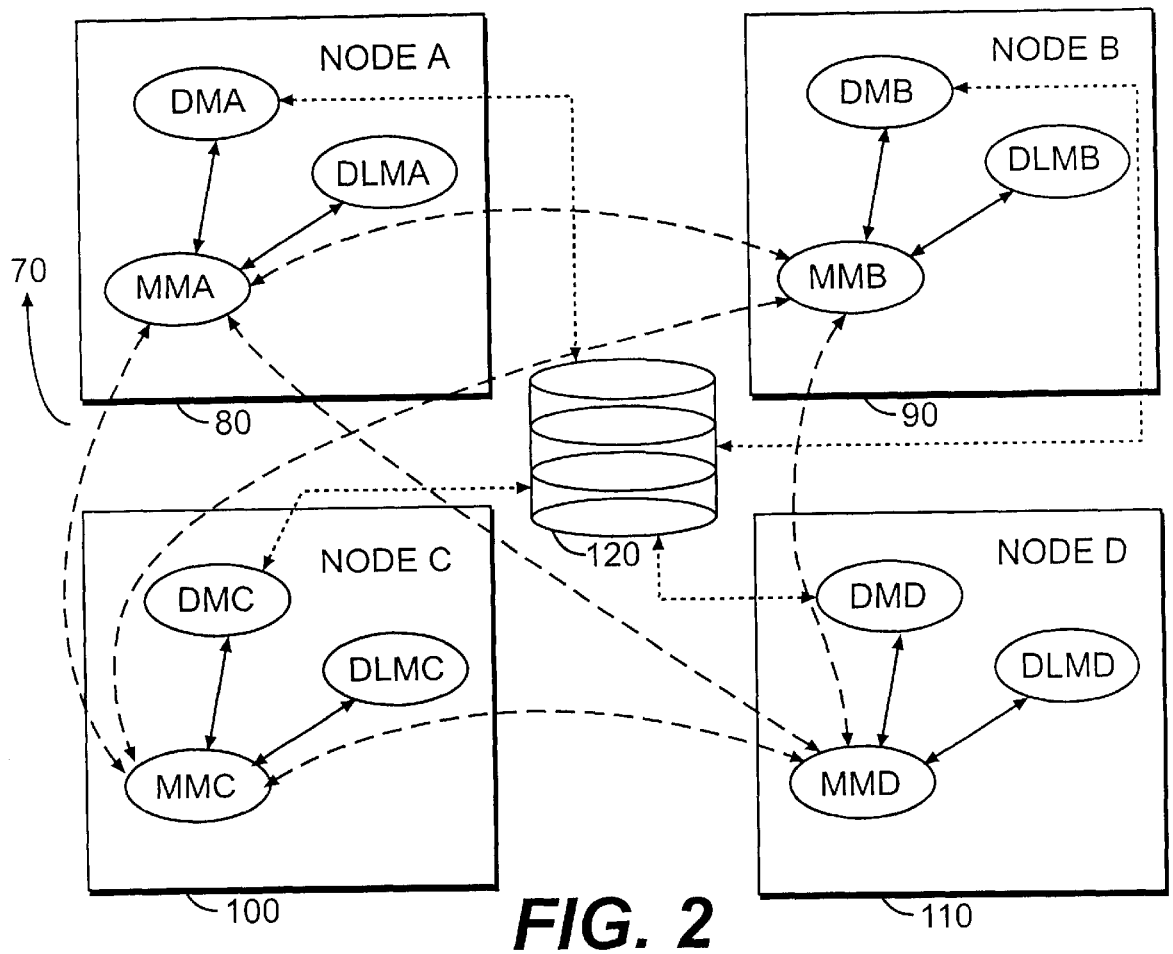
FIG. 2 is a more detailed block diagram of a system similar to that of FIG. 1, but showing elements of the system of the invention that interact to achieve disk fencing.

FIG. 2 illustrates in greater detail a clustered system 70 implementing the invention. The system 70 includes four nodes 80–110 (Nodes A–D) and at least one shared disk system 110. The nodes 80–110 may be any conventional cluster nodes (such as workstations, personal computers or other processor-based systems like nodes 20–40 or any other appropriate cluster nodes), and the disk system may be any appropriate shared disk assembly, including a disk system 50 as discussed in connection with FIG. 1.

Each node 80–110 includes at least the following software modules: disk manager (DM), an optional distributed lock manager (DW, and membership monitor (NM. These modules may be for the most part conventional as in the art of clustered computing, with modifications as desired to implement the features of the present invention. The four MM modules MMA-MMD are connected in communication with one another as illustrated in FIG. 2, and each of the disk manager modules DMA-DMD is coupled to the disk controller (not separately shown) of the disk system 120.

Nodes in a conventional clustered system participate in a "membership protocol", such as that described in the *VAXcluster Principles* cited above. The membership protocol is used to establish an agreement on the set of nodes that form a new configuration when a given node is dropped due to a perceived failure. Use of the membership protocol results in an output including (a) a subset of nodes that are considered to be the current members of the system, and (b) an "epoch number" (EN) reflecting the current status of the system. Alternatives to the EN include any time or status value uniquely reflecting the status of the system for a given time. Such a membership protocol may be used in the present system.

Figure 3:
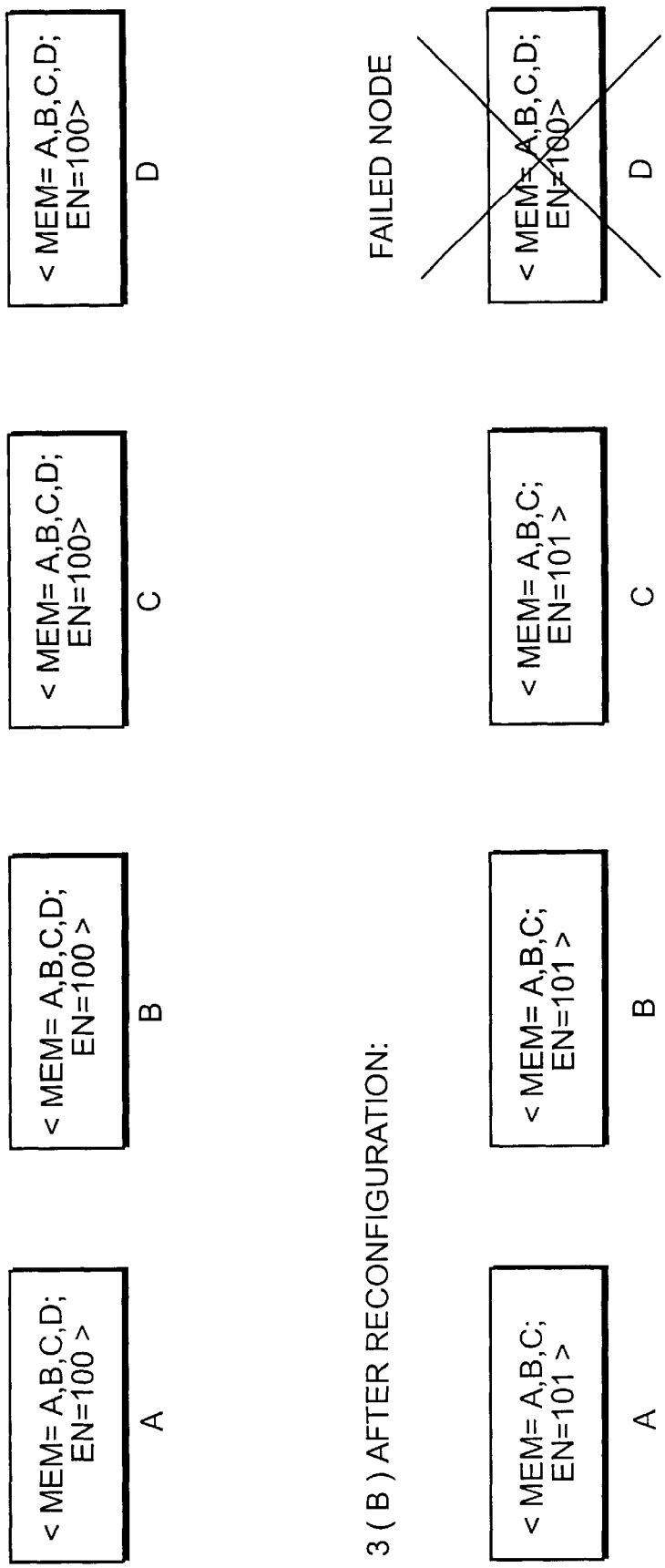
FIG. 3 is a diagram illustrating elements of the structure of each node of FIG. 2 or FIG. 3 before and after reconfiguration upon the unavailability of node D.

According to membership protocol, whenever the membership set changes a new unique epoch number is generated and is associated with the new membership set. For example, if a system begins with a membership of four nodes A–D (as in FIG. 2), and an epoch number 100 has been assigned to the current configuration, this may be represented as <A, B, C, D; #100> or <MEM=A, B, C, D; EN=100>, where EM stands for "membership". This is the configuration represented in FIG. 3(*a*), where all four nodes are active, participating nodes in the cluster.

If node D crashes or is detected as malfunctioning, the new membership becomes <MEM=A, B, C; EN=101>; that is, node D is eliminated from the membership list and the epoch number is incremented to 101, indicating that the epoch wherein D was most recently a member is over. While all the nodes that participate in the new membership store the new membership list and new epoch number, failed node D (and any other failed node) maintains the old membership list and the old epoch number. This is illustrated in FIG. 3(b), wherein the memories of nodes A–C all store <MBM=A, B, C; EN=101>, while failed and isolated node D stores <MEM=A, B, C, D; EN=100>.

The present invention utilizes this fact - - - i.e. that the current information is stored by active nodes while outdated information is stored by the isolated node(s) - - - to achieve disk fencing. This is done by utilizing the value of a "control key" (CK) variable stored by the nodes and the shared disk system's controller (e.g. in volatile memory of the disk controller).

Figure 4:
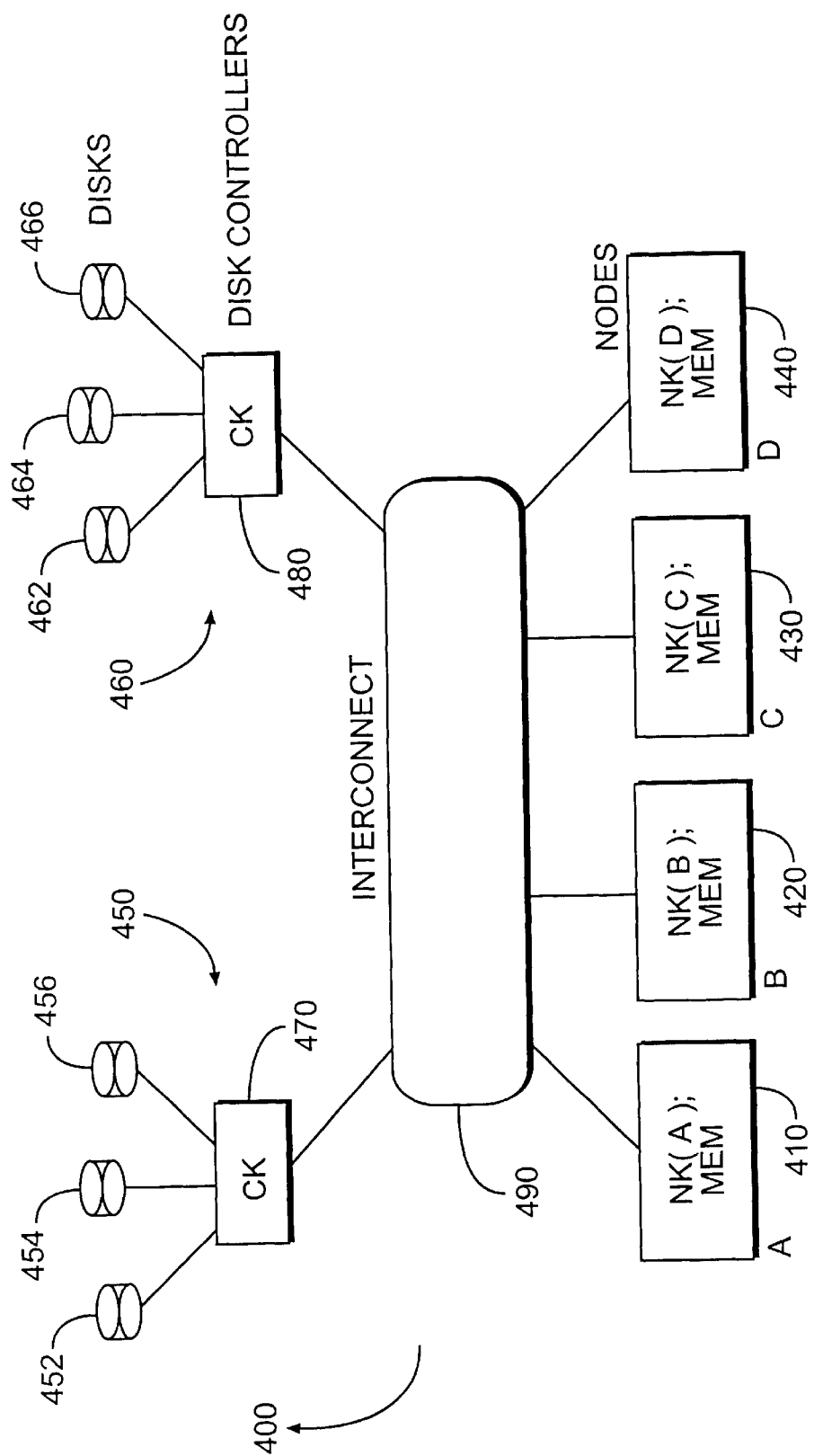
FIG. 4 is a block diagram of a system of the invention wherein the nodes access more than one set of shared disks.

FIG. 4 is a block diagram of a four-node clustered system 400 including nodes 410–440 and two shared disk systems 450–460 including disks 452–456 (system 450) and 462–466 (system 460). Disk systems 450 and 460 are controlled, respectively, by disk controllers 470 and 480 coupled between the respective disk controllers and a cluster interconnect 490.

The nodes 410–440 may be processor-based systems as described above, and the disk controllers are also as described above, and thus the nodes, shared disk systems (with controllers) and cluster interconnect may be conventional in the art, with the addition of the features described herein.

Each node stores both a "node key" (NK) variable and the membership information. The NK value is calculated from the current membership by one of several alternative functions, described below as Methods 1–3. FIG. 4 shows the general situation, taking into account the possibility that any of the nodes may have a different CK number than the rest, if that node has failed and been excluded from the membership set.

As a rule, however, when all nodes are active, their respective stored values of NK and the value of CK stored at the disk controllers will all be equal.

Node/Disk Controller Operations Using Node Key and Control Key Values

Each read and write request by a node for accessing a disk controller includes the NK value; that is, whenever a node requests read or write access to a shared disk, the NK value is passed as part of the request This inclusion of the NK value in read and write requests thus constitutes part of the protocol between the nodes and the controller(s).

The protocol between the nodes and disk controller also includes two operations to manipulate the CK value on the controller GetKey to read the current CK value, and SetKey to set the value of CK to a new value. GetKey does not need to provide an NK value, a CK value, or an EN value, while the SetKey protocol uses the NK value as an input and additionally provides a new CK value "new.CK" to be adopted by the controller.

The four foregoing requests and their input/output arguments may be represented and summarized as follows:

Read(NK, . . . ) Write(NK, . . . ) GetKey( . . . )
SetKey(NK, new.CK)

The GetKey( . . . ) operation returns the current value of CK. This operation is never rejected by the controller.

The SetKey(NK,new.CK) operation first checks if the NK field in the request matches the current CK value in the controller. In the case of a match, the CK value in the controller is set equal to the value in the "new.CK" field (in the SetKey request). If NK from the requesting node doesn't match the current CK value stored at the controller, the operation is rejected and the requesting node is sent an error indication.

The Read(NK, . . . ) and Write(NK, . . . ) operations are allowed to access the disk only if the NK field in the packet matches the current value of CK. Otherwise, the operation is rejected by the controller and the requesting node is sent an error indication.

When a controller is started, the CK value is preferably initialized to 0.

Procedure Upon Failure of a Node

When the membership changes because one or more failed nodes are being removed from the system, the remaining nodes calculate a new value of CK from the new membership information (in a manner to be described below). One of the nodes communicates the new CK value to the disk controller using the SetKey(NK, new.CK) operation. After the new CK value is set, all member (active) nodes of the new configuration set their NK value to this new CK value.

If a node is not a part of the new configuration (e.g. a failed node), it is not allowed to change its NK. If such a node attempts to read or write to a disk, the controller finds a mismatch between the new CK value and the old NK value.

When a node is started, its NK is initialized to a 0 value.

Procedures for Calculating Values of the Control Key (CK)

The control key CK may be set in a number of different ways. The selected calculation will be reflected in a software or firmware module stored and/or mounted at least at the controller. In general, the calculation of the CK value should take into account the membership information:

$$CK=func(MEM,EN)$$

where: HI includes information about the active membership list; and EN is the epoch number.

Method 1. Ideally, the CK value would explicitly include both a list of the new membership set (an encoded set of nodes) and the epoch number. This may not be desired if the number of nodes is high, however, because the value of CK would have to include at least a bit of information for each node. That is, in a four-node configuration at least a four-bit sequence BBBB (where B=0 or 1) would need to be used, each bit B indicating whether a given associated node is active or inactive (failed). In addition, several bits are necessary for the epoch number EN, so the total length of the variable CK may be quite long.

Method 2 and 3 below are designed to compress the membership information when calculating the CK value.

Method 2 uses only the epoch number EN and ignores the membership list MEM. For example, the CK value is set to equal the epoch number EN.

Method 2 is most practical if the membership protocol prevents network partitioning (e.g. by majority quorum voting). If membership partitioning is allowed, e.g. in the case of a hardware failure, the use of the CK value without reflecting the actual membership of the cluster could lead to conflicts between the nodes on either side of the partition.

Method 3 solves the challenge of Method 2 with respect to partitions. In this method, the CK value is encoded with an identification of the highest node in the new configuration. For example, the CK value may be a concatenation of a node identifier (a number assigned to the highest node) and the epoch number. This method provides safe disk fencing even if the membership monitor itself does not prevent network partitioning, since the number of the highest node in a given partition will be different from that of another partition; hence, there cannot be a conflict between requests from nodes in different partitions, even if the EN's for the different subclusters happen to be the same.

Of the foregoing, with a small number of nodes Method 1 is preferred, since it contains the most explicit information on the state of the clustered system. However, with numerous nodes Method 3 becomes preferable. If the system prevents network partitioning, then Method 2 is suitable.

The Method of the Invention

Figure 5:
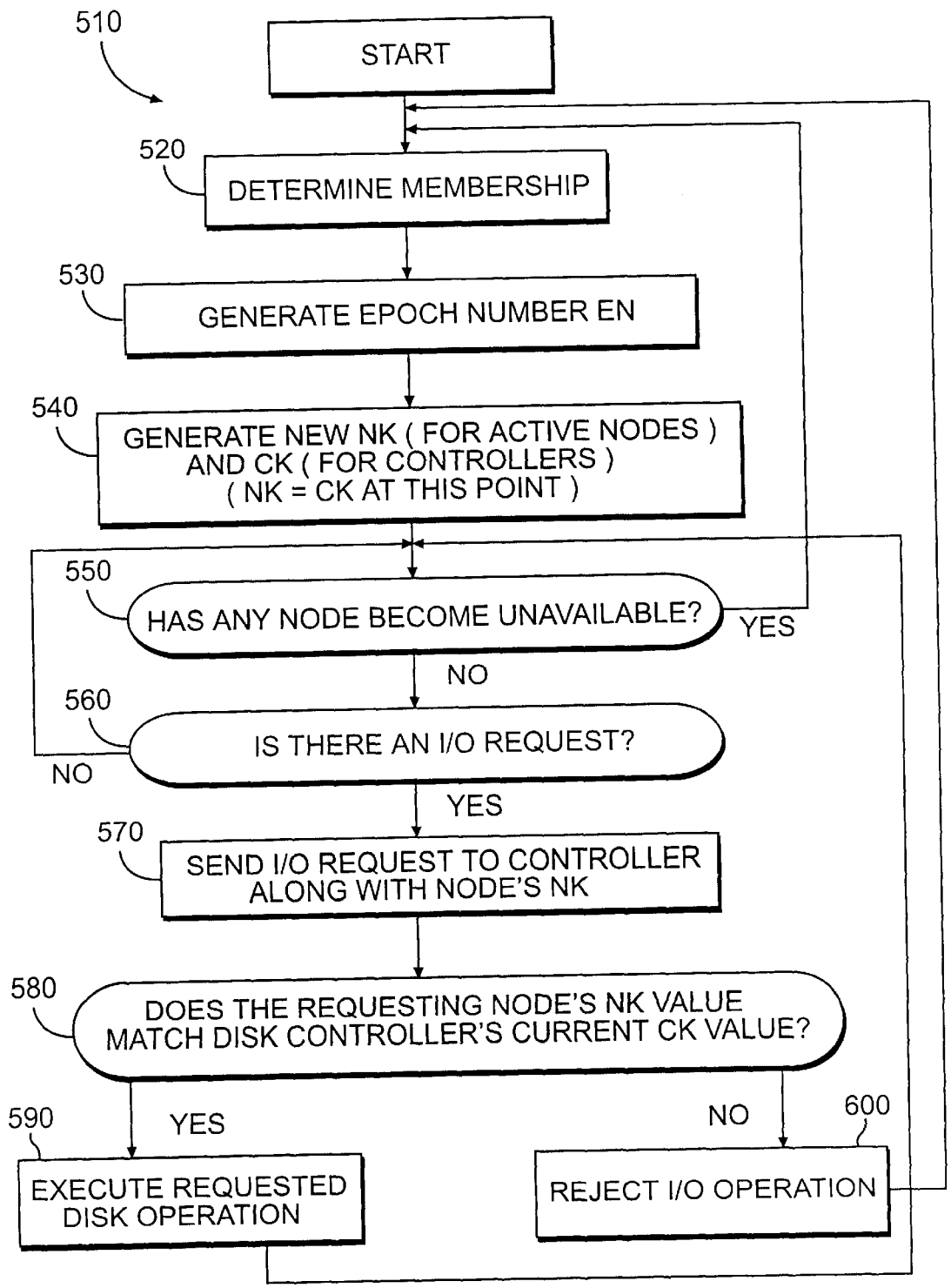
FIG. 5 is a flow chart illustrating the method of the invention.

Given the foregoing structures and functions, and appropriate modules to implement them, the disk fencing system of the invention is achieved by following the method 510 illustrated in the flow chart of FIG. 5. At box (step) 520, the membership of the clustered system is determined in a conventional manner, and the value of the membership set (or list) is stored as the value of MEM. An epoch number EN (or other unique state identifier) is generated at box 530. These two functions are carried out by the membership monitor (M) module, which is implemented among the member nodes to determine which nodes are present in the system and then to assign, a value of EN to that configuration. An example of a system that uses an MM module in this way is applicant Sun Microsystems, Inc.'s SparcCluster PDB (parallel database).

In current systems, the epoch numbers are used so that a node can determine whether a given message or data packet is stale; if the epoch number is out of date then the message is known to be have been created during an older, different configuration of the cluster. (See, for instance, T. Mann et al., "An Algorithm for Data Replication", DEC SRC Research Report, June 1989, incorporated herein by reference, wherein epoch numbers are described as being used in stamping file replicas in a distributed system.)

The present system uses the epoch number in an entirely new way, which is unrelated to prior systems' usage of the epoch number. For an example of a preferred manner of using a cluster membership monitor in Sun Microsystems, Inc.'s systems, see Appendix A attached hereto, in which the reconfiguration sequence numbers are analogous to epoch numbers. Thus, the distinct advantage is presented that the current invention solves a long-standing problem, that of quickly and reliably eliminating failed nodes from a cluster membership and preventing them from continuing to access shared disks, without requiring new procedures to generate new outputs to control the process; rather, the type of information that is already generated may be used in conjunction with modules according to the invention to accomplish the desired functions, resulting in a reliable high-availability system.

Proceeding to box 540, the node key NK (for active nodes) and control key CK are generated by one of the Methods 1–3 described above or by another suitable method.

At box 550, it is determined whether a node has become unavailable. This step is carried out virtually continuously (or at least with relatively high frequency, e.g. higher than the frequency of I/O requests); for instance, at almost any time a given node may determine that another node has exceeded the allowable time to respond to a request, and decide that the latter node has failed and should be removed from the cluster's membership set. Thus, the step in box 550 may take place almost anywhere during the execution of the method.

Box 560 represents an event where one of the nodes connected to the cluster generates an I/O request (such as a disk access request). If so, then at box 570 the current value of NK from the requesting node is sent with the I/O access request, and at box 580 it is determined whether this matches the value of CK stored by the controller. If not, the method proceeds to step 600, where the request is rejected (which may mean merely dropped by the controller with no action), and proceeds then back to box 520.

If the node's NK value matches the controller's CK value, then the request is carried out at box 590.

If a node has failed, then the method proceeds from box 550 back to box 520, where the failed node is eliminated in a conventional fashion from the membership set, and thus the value of MEM changes to reflect this. At this time, a new epoch number E is generated (at box 530) and stored, to reflect the newly revised membership list. In addition, at box 540 a new control key value CK is generated, the active nodes' NK values take on the value of the new CK value, and the method proceeds again to boxes 550–560 for further disk accesses.

It will be seen from the foregoing that the failure of a given node in a clustered system results both in the removal of that node from the cluster membership and, importantly, the reliable prevention of any further disk accesses to shared disks by the failed node. The invalidating of the failed node from shared disk accesses does not rely upon either hardware or software of the failed node to operate properly, but rather is entirely independent of the failed node.

Since the CK values are stored at the disk controllers and are used by an access control module to prevent failed nodes from gaining shared disk access, the disk fencing system of the invention is as reliable as the disk management software itself. Thus, the clustered system can rapidly and reliably climate the failed node with minimal risk of compromising the integrity of data stored on its shared disks.

The described invention has the important advantage over prior systems that its end-to-end properties make it independent of disk interconnect network or bus configuration; thus, the node configuration alone is taken into account in determining the epoch number or other unique status value, i.e. independent of any low-level mechanisms (such as transport mechanisms).

Note that the system of the invention may be applied to other peripheral devices accessed by multiple nodes in a multiprocessor system. For instance, other I/O or memory devices may be substituted in place of the shared disks discussed above; a controller corresponding to the disk controllers 470 and 480 would be used, and equipped with software modules to carry out the fencing operation.

In addition, the nodes, i.e. processor-based systems, that are members of the cluster can be any of a variety of processor-based devices, and in particular need not specifically be personal computers or workstations, but may be other processor-driven devices capable of issuing access requests to peripheral devices such as shared disks.

What is claimed is:

1. A computer usable medium having computer readable code embodied therein for preventing access to a shared peripheral device by a processor-based node in a multinode system having a plurality of nodes, the resource being coupled to the system by a resource controller, the computer usable medium comprising:

a membership monitor module configured to determine a membership list of the nodes including said resource, on the system at predetermined times, including at least at a time when the membership of the system changes;

a resource manager module configured to determine when the resource is in a failed state and for communicating the failure of the resource to said membership monitor to indicate to the membership monitor to generate a new membership list;

a configuration value module configured to generate a unique value based upon said new membership list and to store said unique value locally at each node on the system, wherein said configuration value module includes a submodule configured to generate the unique value based upon an epoch number generated by a membership protocol module; and an access control module configured to block access requests by at least one requesting node to said resource when the locally stored unique value at said requesting node does not equal the unique value stored at said resource controller.

* * * * *